Nov. 8, 1966  E. N. WRENSHALL  3,284,089
SEAL FOR A VALVE OPERATOR
Filed May 6, 1963
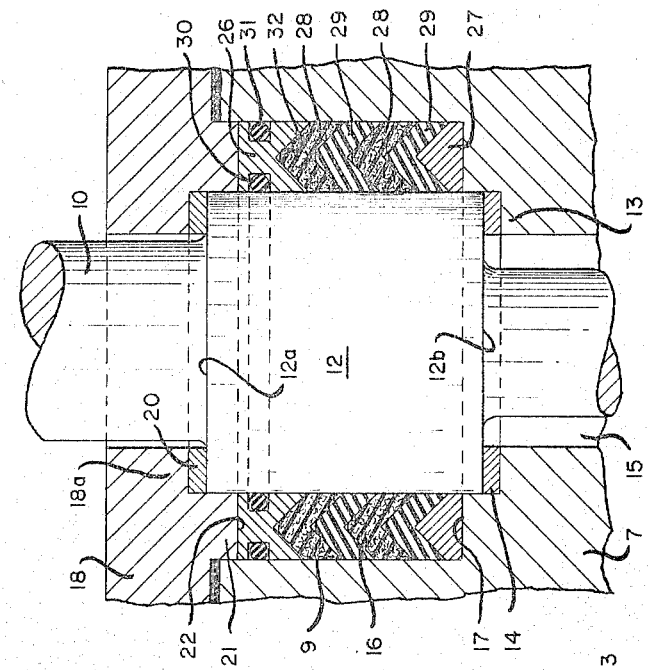
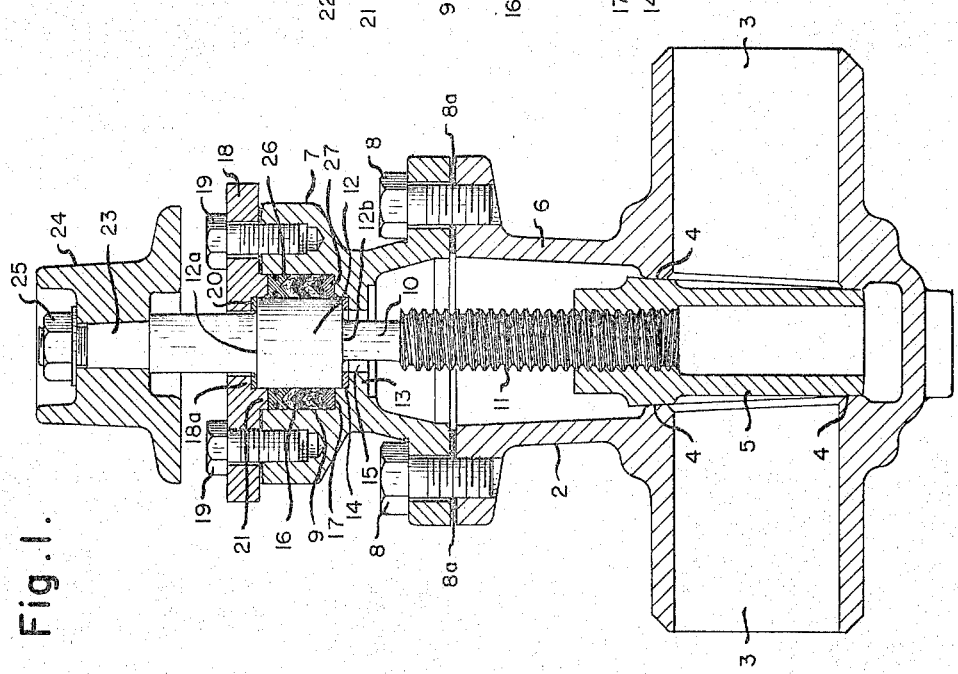
INVENTOR
Edward N. Wrenshall United States Patent Office 3,284,089
Patented Nov. 8, 1966

3,284,089
SEAL FOR A VALVE OPERATOR
Edward N. Wrenshall, Ross Township, Allegheny County, Pa., assignor to Miller Printing Machinery Co., Pittsburgh, Pa., a corporation of Pennsylvania
Filed May 6, 1963, Ser. No. 278,200
2 Claims. (Cl. 277—125)

The present invention relates to a seal for a valve operator and particularly such a seal adapted for use in a valve in a gas line in which the pressure may vary substantially and in which at times a vacuum may be drawn on the line and in which gases varying widely in temperature may be conducted. The invention provides improved sealing means for the valve insuring an effective seal under all conditions of use, particularly differing conditions of pressure and temperature.

It is customary to pack the stems of gas distribution valves with V ring packing elements with the V's pointing outwardly. The packing elements are supposed to flex and press more tightly against the valve stem and casing when subjected to pressure in the line. However, when the line pressure is very low the gas tends to seep past the V ring packing elements without flexing the packing elements into effective sealing relationship with the valve stem and casing with the result that the gas leaks out. Also the V ring packing elements are ineffective to prevent leakage of air from the outside through the valve into the line when a vacuum is drawn on the line. Despite the fact that the shortcomings of V ring packing elements have long been known to those skilled in the art the problem of sealing gas distribution valves to insure against leakage under all conditions of operation has not heretofore been satisfactorily solved.

I have solved the problem by utilizing as packing about the valve stem in combination flexible packing and a rigid member with an internal O ring sealed to the valve stem and an external O ring sealed to the casing, the flexible packing and the rigid member being disposed in face to face contact with each other along the stem. The rigid member provided with internal and external O rings effectively seals the valve against low pressure leakage and against leakage of outside air into the line when a vacuum is drawn on the line. That member is also effective to seal the valve in case gas is forced past or through the flexible packing when the pressure in the line is high. On the other hand the flexible packing which is of relatively great bulk acts to protect the O rings which are of relatively little bulk against deterioration when the gas in the line is at such high temperature that without the interposition of the flexible packing the hot gas might bake out the O rings. Thus the utilization in combination of the flexible packing and the rigid member with the internal and external O rings effectively solves the problem of sealing the valve against both outward and inward leakage under all conditions of pressure and temperature.

The rigid member with the internal and external O rings is preferably disposed outwardly of the flexible packing so that the flexible packing will protect the O rings against hot gas in the line. The flexible packing preferably comprises V ring means with the V pointing outwardly. Normally a plurality of nested V ring packing elements are employed.

The flexible packing is preferably confined between inner and outer adapters at least one of which constitutes the rigid member above referred to with an internal O ring sealed to the stem and an external O ring sealed to the casing. Preferably the outer adapter is provided with the O rings.

The adapters, or at least the adapter which is provided with the inner and outer O rings, are preferably rigid. The adapters may be made of metal such as brass or steel or they may be made of rigid plastic material. The packing in between the adapters is flexible. I prefer to alternate V ring packing elements of elastomer with V ring packing elements of non-elastic material such as duck impregnated with elastomer. The O rings are preferably of elastomer. Various elastomers may be employed such as natural rubber, neoprene, Buna-N, Teflon, etc.

Other details, objects and advantages of the invention will become apparent as the following description of a present preferred embodiment thereof proceeds.

In the accompanying drawings I have shown a present preferred embodiment of the invention in which FIGURE 1 is a cross-sectional view axially through a gas distribution valve and also through the center line of the gas passage through the valve with which the gas line is connected and illustrating my improved packing means; and FIGURE 2 is a fragmentary enlarged cross-sectional view of the portion of the structure shown in FIGURE 1 and more clearly illustrating my novel packing means.

Referring now more particularly to the drawings, there is shown a valve casing comprising a main housing 2 through which a gas passage 3 extends and having opposed inclined integral seats 4. The valve element is shown at 5 and is mounted for vertical movement between an operative position closing the gas passage 3 through tight engagement with the seats 4 as shown in FIGURE 1 and an inoperative position in which the gas passage 3 is open, the valve element 5 being raised into the neck portion 6 of the housing 2 to inoperative position.

A bonnet 7 is applied to the housing 2, being fastened thereto by bolts 8, suitable sealing means 8a being provided between the housing and bonnet as is customary in the art. The housing 2 and bonnet 7 together with the thrust collar hereinafter described form the valve casing. The bonnet has a cylindrical chamber 9 which is open at the top.

The valve element 5 is raised and lowered by means of a stem 10 which has a threaded portion 11 which is threaded into the valve element 5 so that when the stem 10 is turned in place the valve element moves axially of the stem. The stem 10 has an integral cylindrical enlargement 12 with flat top and bottom faces 12a and 12b respectively disposed at right angles to the axis of the stem 10, the enlargement 12 being disposed in the cylindrical chamber 9 of the bonnet 7. The downward thrust of the enlargement 12 when the valve element 5 is being moved outwardly is taken by the portion 13 of the bonnet having a flat upper face through a flat thrust washer 14. The bonnet has a passage 15 receiving the portion of the stem inwardly of the enlargement 12.

Packing designated generally by reference numeral 16, preferably preformed to predetermined dimensions, is disposed about the enlargement 12 of the stem 10 within the chamber 9. The packing 16 is confined between an outer adapter 26 and an inner adapter 27, which latter seats on a ledge 17 near the bottom of the chamber 9. The packing 16 is flexible packing comprising a nested plurality or series of V ring packing elements 28 and 29 which are arranged alternately as shown in the drawings. The elements 29 are of elastomer while the elements 28 are of duck impregnated with elastomer. The nested V ring packing elements 28 and 29 have their V's pointing outwardly. The inner adapter 27 has its upper surface shaped to enter the V of the lower V ring flexible packing element 29. The outer adapter 26 has a V-shaped notch 32 fitting over the upper V ring flexible packing element 28 and has an internal O ring 30 and an external O ring 31. The O rings 30 and 31 are of elastomer. The internal O ring 30 seals against the enlargement 12 of the stem 10 while the external O ring 31 seals against the bonnet or casing. The adapters 26 and 27 are of rigid material such as brass or steel or rigid plastic material.

A thrust collar 18 is applied to the bonnet 7 and fastened in place by bolts 19. The thrust collar 18 has a flat annular downwardly facing abutment portion 18a which through a flat thrust washer 20 absorbs the upward thrust of the enlargement 12 when the valve element 5 is being moved downwardly from inoperative to operative position in the housing 2 and seated against the opposed valve seats 4 to close the gas passage 3.

Integral with thrust collar 18 is an annular packing gland 21 which enters the chamber 9 and surrounds the outer end of the enlargement 12, fitting between the outer end of the enlargement 12 and the outer end of the chamber 9, and engages the outer face 22 of the outer adapter 26. Since downward movement of the combination thrust collar and packing gland is positively limited by the bonnet 7 the distance to which the packing gland 21 may enter the annular space between the outer periphery of the upper portion of the enlargement 12 and the inner periphery of the upper portion of the chamber 9 is positively limited so that it is impossible to impose on the packing any pressure in excess of the design pressure.

The outer extremity 23 of the end of the valve stem 10 projecting out of the casing is of non-circular cross section and has applied thereto an exteriorly non-circular wrench receiving portion or hub 24 held in place by a nut 25. Thus the non-circular wrench receiving portion or hub 24 is operatively integral with the stem 10. A wrench with jaws shaped to fit the hub 24 is used to turn the stem 10 to move the valve element 5.

When the gas in the line or gas passage 3 is at low pressure and the valve is open there is a tendency for the gas to seep past the flexible packing elements 28 and 29 without flexing them sufficiently to seal tightly against the valve stem and the casing. Leakage of such gas is prevented by the O rings 30 and 31. Those O rings also inhibit inward leakage of air when a vacuum is drawn on the line. But the rigid member 26 with the internal and external O rings alone would not solve the problem since the O rings would tend to bake out when gas at high temperature is in the line. The packing elements 28 and 29 which are of relatively great bulk protect the O rings 30 and 31 and prevent them from baking out under high temperature. Thus by the combination of the flexible packing means and the rigid member provided with internal and external O rings I effect an optimum seal under all operating conditions of temperature and pressure.

While I have shown and described a present preferred embodiment of the invention it is to be distinctly understood that the invention is not limited thereto but may be otherwise variously embodied within the scope of the following claims.

I claim:

1. A seal for a valve operator comprising a casing, a stem rotatably mounted on and extending into the casing and packing about the stem sealing the stem to the casing, the packing comprising flexible packing and a rigid member with an internal O ring in sealing engagement with the stem and an external O ring in sealing engagement with the casing, the O rings effectively sealing the stem to the casing against low pressure leakage, the flexible packing being disposed inwardly of the O rings inhibiting high pressure leakage and protecting the O rings against deterioration by gas so hot that it would bake out the O rings without the interposition of the flexible packing.

2. A seal as claimed in claim 1 in which the flexible packing consists of nested V rings with the V's pointing outwardly toward the O rings.

References Cited by the Examiner

UNITED STATES PATENTS

| | | | |
|---|---|---|---|
| 1,106,933 | 8/1914 | Farley | 251—214 |
| 2,278,721 | 4/1942 | Jones | 251—214 X |
| 2,744,775 | 5/1956 | Bredtschneider | 251—214 X |
| 3,048,362 | 8/1962 | Scarborough | 251—214 |
| 3,096,070 | 7/1963 | Wolfensperger | 251—214 |
| 3,192,942 | 7/1965 | Manor et al. | 251—214 X |

WILLIAM F. O'DEA, *Primary Examiner.*

ISADOR WEIL, *Examiner.*

D. MATTHEWS, *Assistant Examiner.*